United States Patent
Seidel

[15] 3,636,680
[45] Jan. 25, 1972

[54] FILTERING APPARATUS

[72] Inventor: Günther Seidel, Karl-Laeue Str. 12, Bielefeld, Germany

[22] Filed: Sept. 26, 1968

[21] Appl. No.: 762,690

[30] Foreign Application Priority Data

Sept. 29, 1967 Germany ...................S 112190
Apr. 26, 1968 Germany ...................P 17 57 333.0
July 13, 1968 Germany ...................P 17 82 057.4

[52] U.S. Cl.............................55/291, 55/304, 55/341, 55/378, 137/624.18, 251/303
[51] Int. Cl.................................................B01d 46/04
[58] Field of Search....................55/96, 34, 1, 291–305, 55/378; 137/625.5, 624.18, 624.13; 251/303, 263

[56] References Cited

UNITED STATES PATENTS

| | | | |
|---|---|---|---|
| 1,743,934 | 1/1930 | Ruemelin | 55/300 |
| 1,747,131 | 2/1930 | Parsons | 55/304 |
| 1,751,138 | 3/1930 | Eiben | 55/300 |
| 1,775,304 | 9/1930 | Boesger | 55/300 |
| 1,784,339 | 12/1930 | Clasen et al. | 55/302 |
| 2,954,873 | 10/1960 | Davis | 55/302 |
| 3,385,033 | 5/1968 | Basore et al. | 55/302 |
| 3,390,512 | 7/1968 | Hanes | 55/293 |
| 3,430,419 | 3/1969 | Reinecke et al. | 55/302 |
| 835,774 | 11/1906 | Brand | 137/624.18 |
| 1,088,436 | 2/1914 | Merrell | 55/341 |
| 1,799,113 | 3/1931 | Miedbrodt | 137/624.18 |
| 1,806,513 | 5/1931 | Straus-Scharina | 55/287 |
| 1,818,736 | 8/1931 | Moore | 55/304 |
| 1,907,197 | 5/1933 | Dorfan | 55/273 |
| 2,415,466 | 2/1947 | Curtis | 251/303 |
| 2,576,656 | 11/1951 | Wallin | 55/287 |
| 3,080,694 | 3/1963 | Smith | 55/293 |
| 3,123,091 | 3/1964 | Elsey | 137/625.5 |

FOREIGN PATENTS OR APPLICATIONS

738,305 10/1932 France...................55/300

Primary Examiner—Frank W. Lutter
Assistant Examiner—Bernard Nozick
Attorney—Larson, Taylor and Hinds

[57] ABSTRACT

A filtering apparatus having a single chamber or a plurality of chambers for the cleaning of dust-laden gases by means of flat filter bags. These filter bags are arranged upright and individually twistable at the inside of a casing. The bags are connected by connection rods which are fastened at the narrow side of the bags and for the purpose of cleaning oscillatable in groups around their pivot axes. A filtering apparatus having a plurality of gas flow chambers, and valves operated by a control shaft to close some chambers for cleaning the filter element therein while leaving other chambers open for continuous operation. The cleaning mechanism is electrically operated in synchronism with the control shaft via cam means on the control shaft which actuate switches to operate the cleaning means. A valve structure comprising a plate operated via cam and follower means by the control shaft and including guide rods and slots to allow the valve plate to undergo linear and pivotal movement.

39 Claims, 22 Drawing Figures

INVENTOR
GÜNTHER SEIDEL

BY Larson and Taylor
ATTORNEYS

INVENTOR
GÜNTHER SEIDEL

*Larson and Taylor*
ATTORNEYS

FILTERING APPARATUS

BACKGROUND

This invention represents a chamber filter with a single chamber or a plurality of chambers for the cleaning of dust-laden gases by means of flat filter bags. These filter bags are applied upright and individually turnable on the inside of a casing. The bags are connected by connection rods, which are fastened to the narrow side of the bags and for the purpose of cleaning oscillatable in groups around their pivot axes.

There are so-called bag filters of this kind where the filter bags are spanned on the outside of frames on one side only in connection with the clean air room and, for instance, an eccentric shaker being used as an oscillator, fixed on the casing of the filter. This construction shows the disadvantage that the cleaning effect of the filter bags is not sufficient, due to the fact that they are stretched in their frame on one side only and that therefore the energizing force must be large with respect to the distortion work. So in newer constructions the filter bags are arranged as packets to provide them with a swinging frame and to connect them with the clean air room by an elastic collar. To the packet of bags an oscillator is fixed, to oscillate the packet to clean the bags, so cleaning the whole of the filter's surface in a nearly uniform manner. But a disadvantage of this construction is the fact that the packets of bags—especially at bigger unities—are rather heavy, and so the power to move them must be rather great to reach a cleaning effect.

There are also other constructions connecting the bags to the clean air room by elastic collars one by one, and bringing them to rotary oscillations around a pivot axis and knocking them for cleaning by an eccentric shaker fixed at the filter casing leading the oscillations by means of a frame to the bags. So, the necessary power for shaking is less, compared with the constructions mentioned above, but the wall of the filter casing—bearing the shaker—and the whole casing, due to the transmission of the counter forces, must be much firmer then and there may be the necessity of placing the filter elastically on its foundation. And there is another disadvantage of this construction: using filters with several chambers, long connection rods eventually with links and joints, connecting the outside of the filter to the swinging frame will become necessary, reducing the shaking power, and requiring additional bearings with necessary maintenance and unavoidable wear and tear.

By this new invention all the disadvantages of filter constructions as mentioned above will be avoided.

The present invention also relates to a filtering apparatus of the type wherein a gas such as air is passed through a plurality of chambers for separation of impurities, e.g., dust, and wherein some of the chambers are closed by valve means for cleaning of the filter elements located therein, while other chambers remain open for continuous operation. In particular, this invention relates to improvements in such filtering apparatus concerning control of the filter element cleaning means, the structure of the valve and the construction of the housing.

The present type of filtering apparatus permits continuous filtering of a gas since, while some of the chambers are closed for cleaning or regeneration of the filtering elements, other chambers remain open for permitting gas flow therethrough. Consequently, there is never a need to shut down the filtering apparatus entirely, solely for the purpose of cleaning the filtering elements.

It is known to use purely mechanical control means for closing the valves and operating filter cleaning or purification means, for example by means of a revolving control shaft and cam. However, this has the disadvantage that the valve closure and above all the purification of the filter elements are often insufficient and wear is considerable. Therefore, the more modern constructions have provided power-operated valves driven by a suitable power source such as electricity, compressed air, etc.; and separately operated cleaning means such as vibrators, unbalance motors, etc. In such known devices the switching on and off of the electrically or pneumatically driven valves and cleaning means is somewhat coordinated by means of an electric control device with a delayed relay and electric time clocks. These constructions however make the filter installations considerably more expensive, since a separate drive will be required for each valve element. This is particularly unfavorable in the case of installations used in environments such as mining where explosions may be a problem. Also because of the large number of switches and the like, maintenance and shutdown problems are considerable.

The above problems can be partially eliminated by switching a combined mechanical-electrical control, where for example the valves are operated by means of a camshaft and where only operation of the cleaning means is brought about by the operation of limit switches upon closing of the valve. However, an electrical control with delayed relay and time clocks remains an unavoidable necessity since the cleaning or purification time does not coincide precisely with the valve closure, but a certain amount of time will pass up to the point when a hermetic closure is provided and it will be necessary to switch off the purification device a certain time prior to opening the valve in order to permit time for dust to settle.

Thus, there exists a need for an improved mechanical-electrical control in the present type of filtering apparatus.

The present invention also relates to an improved valve structure for temporarily closing the chamber.

It is known to close the air passage of the individual chambers of multichamber filters, by means of throttle valves mounted on a common rotating member such as a crankshaft. These valves must be fitted with precision so that they will close satisfactorily. However with this type of valve, the seal may soon become worn, especially because of the presence of dust in the environment of the valve. To overcome this disadvantage, more recent designs have employed valves which make it possible to attach elastic seals, thereby reducing the possibility of wear.

SUMMARY OF THE INVENTION

Thus, it is a purpose of the present invention to provide a new and improved filtering apparatus having improved flat filter bags swinging in groups, an improved control means for the cleaning mechanism and an improved valve structure.

According to a first feature of the present invention there is a frame bearing an oscillator connected with an inertia mass, and this oscillator represents together with the swinging frame and the bags a free-swinging combination. Due to the fact that according to this invention the bags swing around single pivot axes, the necessary oscillating power is much less than the power needed for shaking a packet of bags translatorily by a swinging frame. This is caused by the fact that the polar moment of inertia determines the driving power of the rotary oscillation, this polar moment of inertia being much less compared with the moment of mass inertia to be moved translatorily as in the above-mentioned construction.

According to this feature of the present invention the oscillator is united with the frame and the filter bags to one free-swinging system, neither swinging insulators nor guiding springs are necessary, moreover the filter casing can be made far lighter than normally. Using this feature of the invention advantageously, the swiveling axes of the filter bags are lying in a plane transverse to the main reach of the filter bags, and this plane includes the center of gravity of the system's mass. By this, necessary excitation power and the counterpower in the swivel bearings of the filter bags will be reduced to a minimum, and very light constructions of the filter casing are possible, very advantageously especially for bunker top filters.

If—for instance the weight of the oscillator of small filters is too great in relation to the stability of the bags, an upper and a lower bearing for each bag may be placed in an opposite and diagonal position in the main reach of the bag to reduce the weight-load of the bag's frame, and the connections' frame together with the oscillator can seize the filter bags above the lower bearing. So a diagonal nutation results, very often favoring the cleaning effect.

Concerning filters for gases of normal temperature, the oscillator can be protected completely by a dustproof hood. Hereby no special cooling is necessary, taking into consideration that the oscillator is to be used on short terms only—due to the very intensive cleaning effect. Without unnecessarily enlarging the depth of the casing for the oscillator, the casing may—following other detail of this invention—be bulged for the free oscillator. The best place to do so is a door or lid in the casing, this way allowing one to reach the oscillator easily.

At gas temperatures above 100° C., the oscillator is placed inside a hood covering it at one side only. And this open side of the hood will be connected with an opening in the filter's casing by a flexible collar in a dustproof manner.

The bags' covering will be swung by the mass moment of inertia. If the filter bag is swiveled out, due to the placing of the swiveling axes of the filter bags along the rear edge of the frame carrying the filter covering, according to another advantageous feature of this invention, the dust is subjected to a power opposite to the adhesion of the dust, so supported by superimposed oscillations, causing an easy removing of the dust from the surface of the filter.

According to another feature of the present invention the filter bags may be swiveled around axes parallel to the flange leading to clean air, which embraces the opening of the filter bag. Then it is useful to place the connection frame and the oscillator at the free ends of the filter bags, opposite to the swiveling axes. So, in certain cases, due to favorable circumstances, a good cleaning and a simple shaping of the casing will result, even if used as built-in filters, for instance, when used for bunkers.

The single chamber filter—or the multichamber filter—needs, according to the details of this invention, filter bags with swivel axis and individual fixing. Therefore also particulars of the construction of the bags are of great importance that it should be easy to install the filter bags. This will be done as follows: According to a special detail of this invention the flange for clean air, embracing the bag's opening, is equipped with a claw—if possible at the rearmost end—which fits for a guidance when introducing the bag into the filter casing and which fits moreover as an abutment for attaching the flange for clean air at the opposite end. The necessary pressure against the gasket of the clean air opening will be reached by "lever effect," and at the rearmost part, difficult to reach, no manual operations are necessary. If the frames are very long, and if a heavy frame construction has to be avoided, the clean air flange may be bulged in a convex sense—on its long side when not mounted, so, making possible an equal pressure against the gasket of the clean air opening along the whole extension of the flange by fixing this flange for example with a frontal screw.

Another detail for carrying out this invention is that the borders of the filter bags carrying out the swiveling extent with a reduced end under the clean air flange embracing the bags' openings, limiting there to the right and left the swiveling movement of the bags. At the same time, the cleaning effect is assisted by the border's stop. Because of the oscillation movement of the filter bag a knocking effect will be superimposed just in the moment when the inertia mass effect of the filter covering works opposite to the adhesion of the dust.

At last the filter coverings may be stretched up to a certain distance from the clean air flange and loosely lead to the clean air flange and be fixed to it, so making the use of special elastic collars for the connection between the filter bags and the clean air openings unnecessary.

According to another feature of the present invention there is provided an arrangement for eliminating the disadvantages of control means known heretofore for controlling operation of the cleaning means in synchronism with the operation of the valve.

According to this feature of the invention the valves are operated mechanically by a rotating control shaft passing above all filter chambers and the switching on and off of the separate cleaning means takes place by operating switches by a means attached to a disc or a cam lever positively to the control shaft to rotate therewith.

When a rotating shaft such as a crank, crank loop or analogous machine element is used for the purpose of reciprocating the valves then the cam disc or lever is positively coupled to rotate with the rotating shaft. The positive coupling of the cam disc with the shaft makes possible not only the determination of the point in time of the cleaning, relative to the timing of valve opening and closing so that the hermetic closure of the valve can be delayed, but also it makes it possible to determine the duration of the cleaning step independently of the opening valve, so that neither delayed relays nor time clocks will be necessary. In the case of explosionproof installations one cam can use three-pole, explosionproof terminal switches, so that expensive explosionproof relays are eliminated.

In another embodiment the rotating shaft may have fixed thereto a plurality of cams, each cam positioned to cooperate with a follower on one of the valves for opening and closing its respective valve. In this manner it is possible to employ a single straight rotating shaft rather than a crank, or the like.

The next feature of the invention relates to an improved valve structure which eliminates the disadvantages of previously known rotatably mounted throttle valves and the like for closing the valve.

According to this feature of the invention the valve member is in the form of a plate mounted to be pivoted about an axis to be opened and closed, and to be forced closed by means of a cam, attached to the rotating shaft, and by means of an elastic seal on the edge of the valve seat. In order to achieve a good seal and reduce friction, the operating cam of the shaft engages a roller disposed on the valve plate which roller may be, for example, a ball bearing.

Since the complete sealing effect over the entire periphery of the valve plate will be guaranteed only in the case of a certain elastic deformation of the seal, the plate is attached by intermediate elastic elements to the said pivot axis. With this arrangement the flap will be pressed evenly on its complete sealing edge.

Since these intermediate elements, which may be for example, metal-rubber buffers, will impede the rotational movement of the plate because of their elasticity, or may reduce control over the valve plate, guide rods have been provided which, while permitting a shifting of the plate in the direction of the contact pressure against the seal, also permit the pivoting movement of the plate around its rotational axis in the case of opening or closing.

The valve plate according to the invention is of particular advantage in the case of filter installations where the purification or cleaning of the filter surfaces takes place merely through shaking or knocking of the filter surfaces, since this method is reliable only in the case of a hermetic closure of the air passage during the purification. As a result of the invention it will also be possible, because of the good and permanent seal, to eliminate the flushing in the countercurrent in the case of some filter systems which hitherto had been equipped with additional countercurrent flushing system and to purify them merely by means of knocking or shaking.

Thus, it is a purpose of the present invention to provide a new and improved filter apparatus with improved cleaning means and an improved fastening of the filter bags to the housing.

It is another feature of the invention to provide a new and improved control means for synchronizing movement of the cleaning means with movement of the valve members in a multichamber filtering apparatus.

It is another object of this invention to provide a new and improved valve structure for controlling the flow of gases through a filtering apparatus.

Other objects and the attendant advantages of the present invention will become apparent from the detailed description to follow together with the accompanying drawings.

BRIEF DESCRIPTION OF THE DRAWINGS

There follows a detailed description of the preferred embodiments of the present invention to be read together with the accompanying drawings. However, it is to be understood that the details of the description and the accompanying drawings are provided only for purposes of illustration and that the invention is capable of numerous modification and variations apparent to those skilled in the art.

DETAILED DESCRIPTION OF THE PREFERRED EMBODIMENT

Referring to FIGS. 1 through 22, like numerals are employed to indicate like elements throughout. Relative terms such as "left," "right," "top" and "bottom," etc., refer to the elements as shown in the figures. However, these terms are employed merely for purposes of convenience and it will be apparent that the elements are capable of other orientations in practice. The dust-laden air enters—according to the arrows—from below into the dust room 202 the filter casement 201, then it passes the filtering material of the filter bags 203, hereby it will be freed from dust which remains at the surface of the filter, then the air leaves the filter bags 203 at the clean air flange 219 into the clean air hood 204 and leaves the filter casement by the sleeve 205. The filter bags are swivably fixed to the filter casement with an upper bearing 206 and a lower one 207, whereby the swiveling axes 212—as per FIG. 3—lie in a plane transverse to the main extension of the filter bags, and this plane contains the gravity center "S" of the system.

Figure 3:
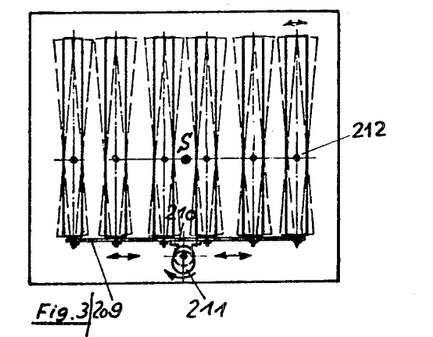

Between the clean air flange 219 of the filter bag, inflexibly fastened to the casement, and being at the same time the upper fixing over the bearing 206, and the swivable part of the filter bag 203 lies the elastic part 208 of the bag. A double frame 209 connects the bags with each other and with the oscillator 210, that is made out of a circular oscillator with balancing wheels 211. Instead of a circular oscillator, other ones may be used if they have an inertia mass that can be made oscillating, as, for instance, compressed air or magnetic oscillators.

When put into operation, the oscillator 210 and the double frame 209 will be brought in a translatory movement, so causing rotary oscillations around the swiveling axis 212 of the filter bags 203—FIG. 3: dotted lines—so making the dust fall down from the filter covering.

Figure 4:
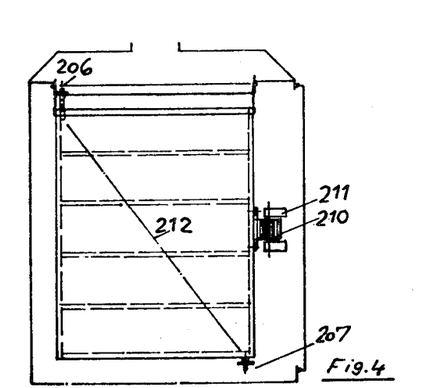
FIG. 4 is a side view of a modified form of the single-chamber filter.

FIG. 4 shows a modified form of a single-chamber filter according to this invention, of which the upper bearing of the bags 206 has been placed at the rear edge and the lower bearing of the bags 207 at the frontal edge of the bag filter. In consequence of this modification, the swiveling axis runs diagonally to the main direction of the filter bag, and so the latter is forced to nutations when being shaken by the oscillator 10. Hereby the weight of the oscillator 210 weighs upon on the frontal edges of the bag frames—without bending strain.

Figure 2:
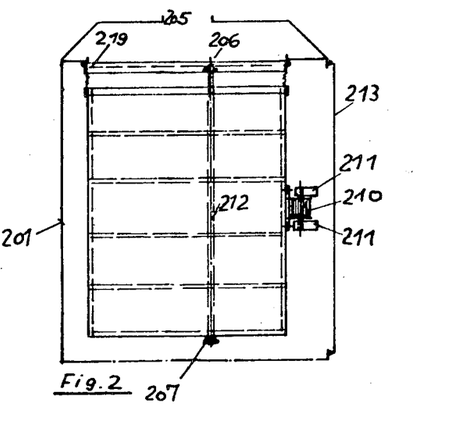
Figure 5:
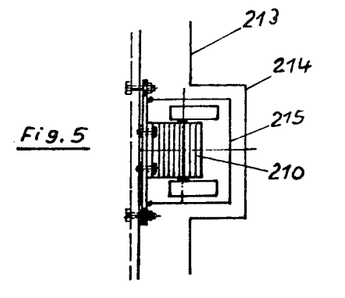
FIG. 5 is a detailed side view of the oscillator.

FIG. 5 shows a detail of FIG. 2 whereby the oscillator is protected by a hood 215 in a dustproof manner, and it is placed together with this hood in the bulge 214 of the door or lid 213 of the filter casing.

Figure 6:
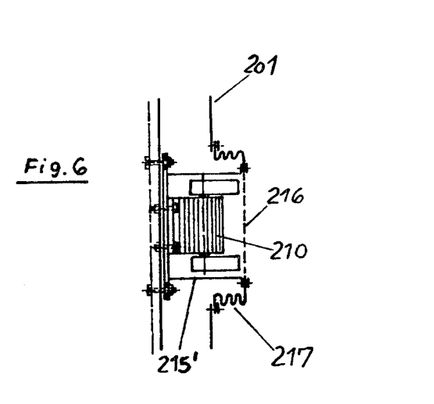
FIG. 6 is a modified form of the oscillator shown in FIG. 5.

FIG. 6 shows a similar picture, but here the hood 215' is not closed and only covered by the sieve 216 for protection against touching. A collar 217 works as an elastic joint between hood 215' and casement 201. This construction of this detail is very recommendable for the cleaning of gases of high temperatures, where the hood 215' may be equipped additionally with an insulation against heat or with a heat shunt.

Figure 1:
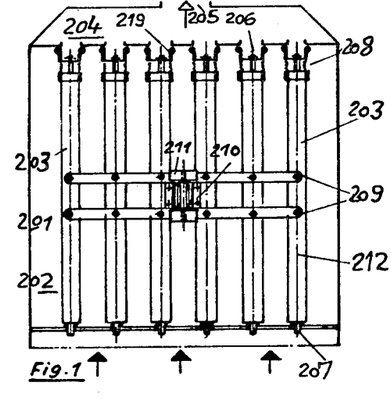
Figure 7:
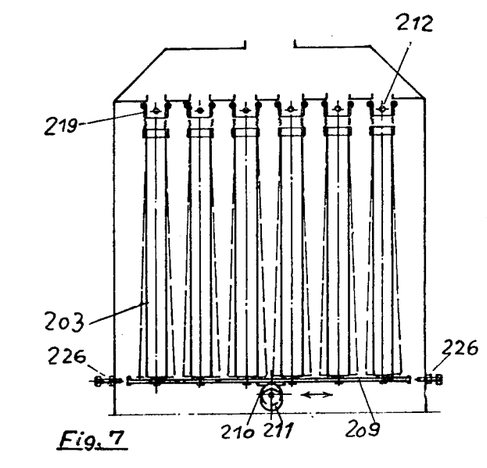
FIG. 7 is a front view of a single-chamber filter wherein the filter bags are subjected to pendulumlike motion.

FIG. 7 shows a single-chamber filter, similar to FIG. 1, but with the filter bags 203 having horizontal swiveling axes 212 which are running in a parallel way to the clean air flanges 219 (inside their long sides), and in consequence of this order the bags are allowed to swing in pendulum fashion. The rods 209 and the oscillator 210 with the balancing wheels 211 are placed at the free lower end of the filter bags 203.

Figure 8:
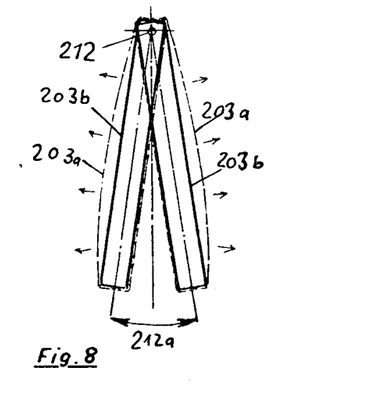
FIG. 8 is a detailed view of the pendulumlike motion experience by a filter bag.

FIG. 8 shows the high cleaning effect at a filter bag 203, placed in pendulum fashion around a swiveling axle 212 and swinging around an angle 212a.

Due to the inertia of the mass in the dead point of the oscillating process, the filter covering 203a of the frame 203b is bulged in the direction of the arrows, so loosening the crust of dust and knocking it off from the filter covering 203a (by the forces of the inertia of the mass, working opposite to the adhesion of the dust).

Figure 9:
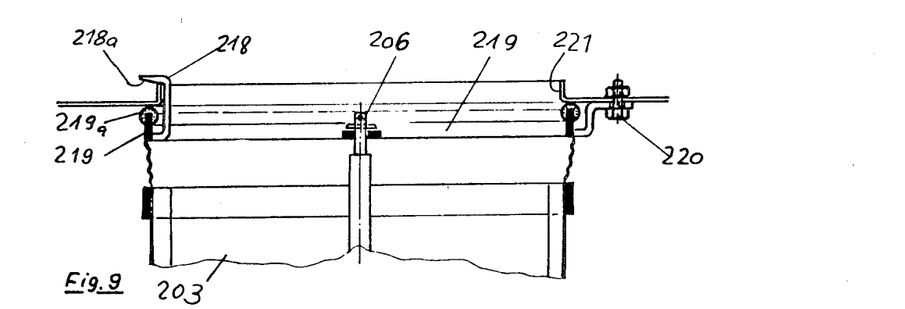
FIG. 9 and 10 illustrate the filter bag connection means connecting the bag to the clean air flange, FIGS. 11, 12 and 13 relate to a side and two front views, respectively, of filter bags with filter coverings thereon.
Figure 10:
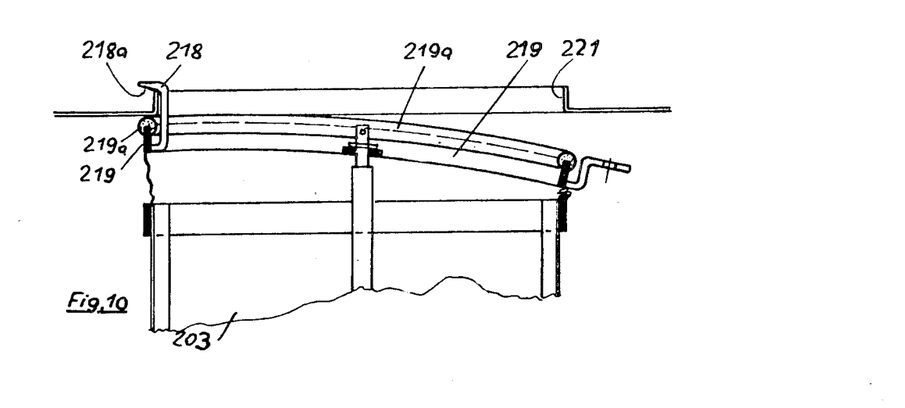

FIGS. 9 and 10 show a special kind of bag extremely advantageous—at the clean air flange 219. A claw 218 extends into the clean air opening 221 of the filter casement as guidance and stops and works finally together with a frontal fixing screw 220 as the rearmost attachment of the clean air flange. The wedge-shaped end of the claw at 218a causes a pressure against the gasket 219a.

If the flange is long, the clean air flange 219 should show a convex bend of the long sides, so stretching the clean air flange by screwing on the screw 220, and so causing an equal pressure against the gasket 291a for the whole length of the flange. So, a good connection is possible without making the flange frame too strong.

Figure 11:
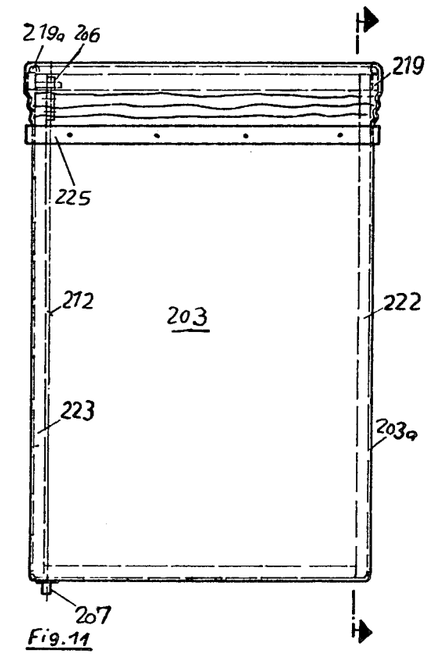
Figure 12:
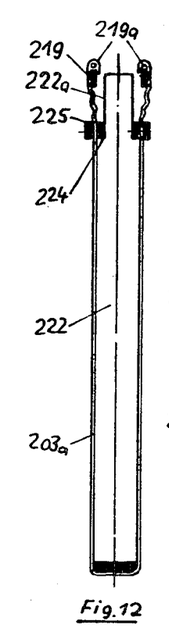
Figure 13:
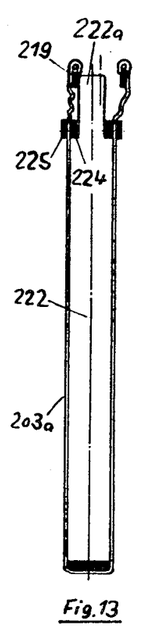

FIGS. 11 to 13 show a filter bag 203, of which the filter covering 203a has been stretched tightly over the frame of the bags—by the edges 222 and 223, between the edges 224 and 225. In the higher placed elastic parts of the bag the filter covering 203a will loosely be led to the clean air flange 219 and to the gasket 219a—packing cord gasket—where it is stuck to the clean air flange.

In the elastic part, the frontal edge 222 is reduced, and this reduced part 222a extends into the clean air flange 219, making possible there a limited swiveling movement of the bag as shown in FIG. 13, and knocks some way on the bag, so reinforcing additionally the cleaning effect.

Instead of the prescribed shaping of the frontal edges of the filter bags, a knocking effect corresponding to FIG. 7 can easily be achieved by lengthening the connection rods 209 to both sides, over the filter bags 203, and if in the directions of these lengthenings adjustable stops 226 are provided they are touching the ends of the rods when cleaning the bags.

Figure 14:
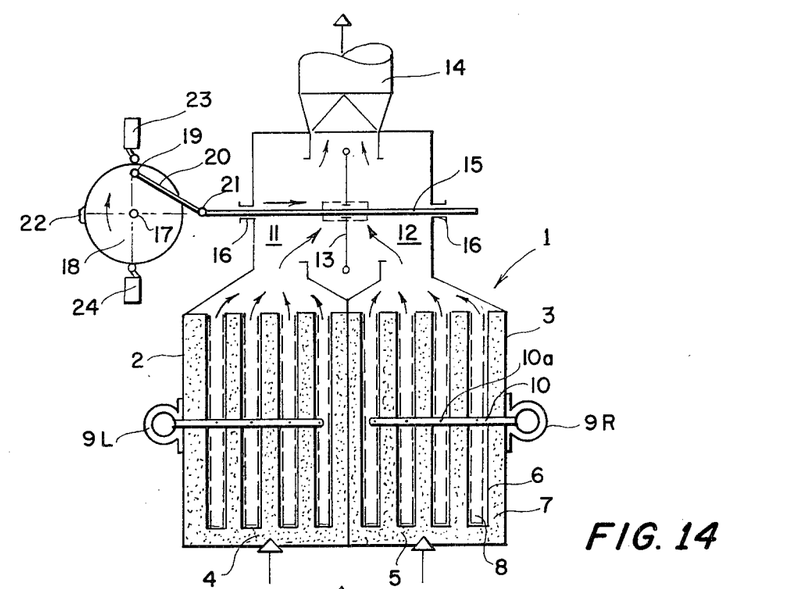
FIG. 14 shows schematically a cross section of a twin-chamber filtering apparatus.

FIG. 14 shows a twin-chamber filter apparatus 1 having a left chamber 2 and a right chamber 3. The gas to be filtered enters the chambers 2 and 3 through inlet openings 4 and 5 respectively. Since the details of the chambers may be known per se or are like that shown in FIGS. 1-13 and described above and since they are the same for both the left and the right chambers, only the elements of the right-hand chamber 3 are labeled. The chamber includes a porous filter element 6 which permits the flow of gases but traps the impurities to be filtered from the gases. This filter element divides the interior of the chamber into a dirty side 7 and a clean side 8. Motors 9L and 9R are provided for the chambers 2 and 3 respectively, these motors being operable to vibrate the rod 10, thereby agitating the filter element 6 to remove the dust particles therefrom, thereby cleaning the filter element 6.

The gases passing through the chambers 2 and 3 pass through the openings 11 and 12, respectively, and then through the main outlet opening 14. A valve element 13, which may be in the form of a flat plate having an elastic seal on its outer periphery, is mounted on a shaft 15, which shaft is mounted in fixed bearings 16 to be reciprocated back and forth for opening and closing passages 11 and 12.

Movement of the reciprocating shaft 15 is brought about by means of a rotating control shaft 17 having affixed thereto a disc 18 which rotates with the shaft 17. A connecting rod 20 is pivotally connected at one end 19 to the disc 18 and at its other end 21 to the shaft 15. Consequently, rotation of shaft 17 and hence of disc 18, causes reciprocating movement of shaft 15 and hence of valve plate 13.

The disc 18 also includes a raised cam 22 on its outer periphery, which cam cooperates with switches 23 and 24 to operate motors 9R and 9L, respectively, at appropriate times during the revolution of control shaft 17. Finally, the force with which the valve plate 13 closes the passages is determined by means of a prestressing spring arrangement shown symbollically at 25.

Figure 15:
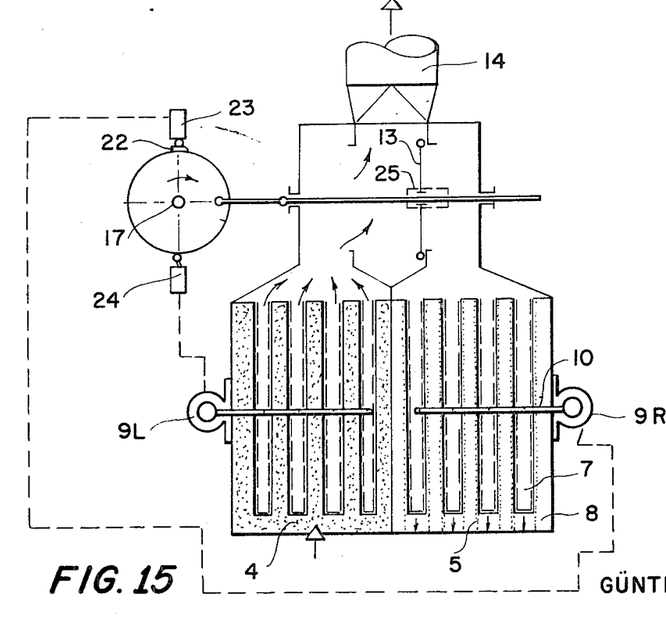
FIG. 15 represents the same twin-chamber filtering apparatus as FIG. 14 but in condition for cleaning one of the filtering elements.

The embodiment of FIGS. 14 and 15 operates as follows: In FIGS. 14, 11, 12 are open so that the gas passes through both chambers 11 and 12 to the main outlet 14. In FIG. 15 the shaft 17 has turned 90°. On the one hand, this movement moves the valve plate 12 to its right-hand end position whereat it closes the passage 12. Concurrently, the cam surface 22 engages the switch 23 thereby causing operation of the right-hand motor 9R which in turn vibrates the rod 10 and hence agitates the filtering element 6 of the chamber 3. Hence, as is illustrated in FIG. 15, the dust falls downwardly from the surface of the filtering element 6 in the chamber 3. Further rotation of the shaft 17 causes movement of valve plate 13 to the left-hand position to close the passage 11. At this time, of course, the cam 22 will operate switch 24 thereby causing actuation of the motor 9L. To assure that the valve plate 13 remains closed for a given period of time the stroke of the shaft 15 is somewhat greater than the stroke of the valve plate 13, the valve plate 13 resiliently engaging the respective surfaces to close the openings 11 and 12 by means of the spring-pretensioning means 25.

Figure 16:
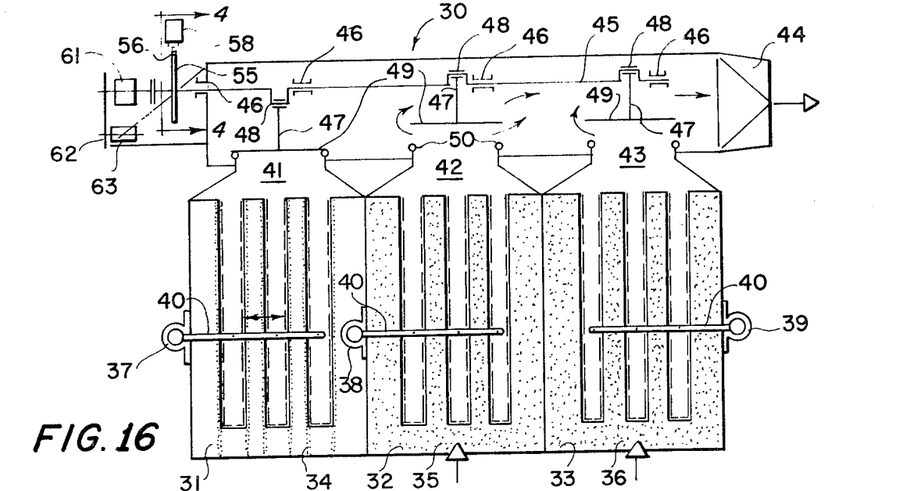
FIG. 16 shows schematically a cross section of a multichamber filtering apparatus employing the features of the present invention.

FIG. 16 illustrates the application of the invention to a multichamber filtering apparatus 30 having left, middle and right chambers 31, 32, 33 respectively, the chambers having inlet openings 34, 35, and 36 respectively, and motors 37, 38, and 39 respectively, for operating their respective vibrating rods 40. The chambers also include outlet passages 41, 42 and 43 respectively, each outlet passage terminating in an elastic lip 50.

In the embodiment of FIG. 16 valve actuation is brought about by a main control shaft 45 rotatably mounted in fixed bearings 46 and including a number of crank portions 48 at which are rotatably mounted connecting rods 47 which are in turn connected to the valve 49. In practice, rotation of the shaft 45 provides selective reciprocating movement of the valve plates 49 to close the valve plates 49 separately at separate times. The chambers 31, 32 and 33 are identical to chambers 2 and 3 of FIGS. 14 and 15; and it will be apparent that a larger number of chambers could be provided in the embodiment of FIG. 16.

Figure 17:
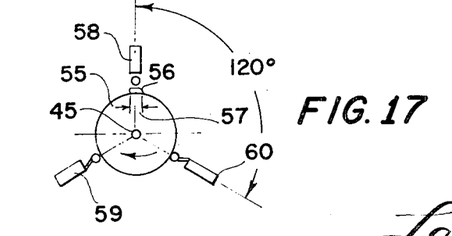
FIG. 17 is a schematic representation of the control elements of FIG. 16 and is taken along line 4—4 of FIG. 16.

Referring now to FIG. 17, as well as FIG. 16, in this embodiment the control shaft is formed as an extension of shaft 45 and the disc 55 is rigid thereon. As is evident in FIG. 17, this embodiment includes a raised cam surface 56 having a raised circumferential distance indicated at 57 and this arrangement includes three switches 58, 59 and 60, one switch being provided for each of the chambers 31, 32 and 33. In FIG. 17 the cam 56 is actuating the switch 58. This operates the motor 37 and of course this occurs at the time that the left-hand valve plate 49 closes the left-hand chamber outlet opening 41. As is evident from FIG. 16, at this time the rod 40 is vibrated and the filtering element located therein is cleaned.

In this embodiment the shaft 45 is rotated by a driving means 61 which is in turn operated through a V-belt drive 62 by means of drive motor 63. In a manner similar to the operation described above with respect to FIGS. 14 and 15, upon further rotation of the shaft 45, the other valve plates 49 will be closed at appropriate times and their motors 38 and 39 will be operated accordingly. In this embodiment the gases passing through those outlet openings 41, 42 and 43 which are open continue onto the main outlet opening 44.

Figure 18:
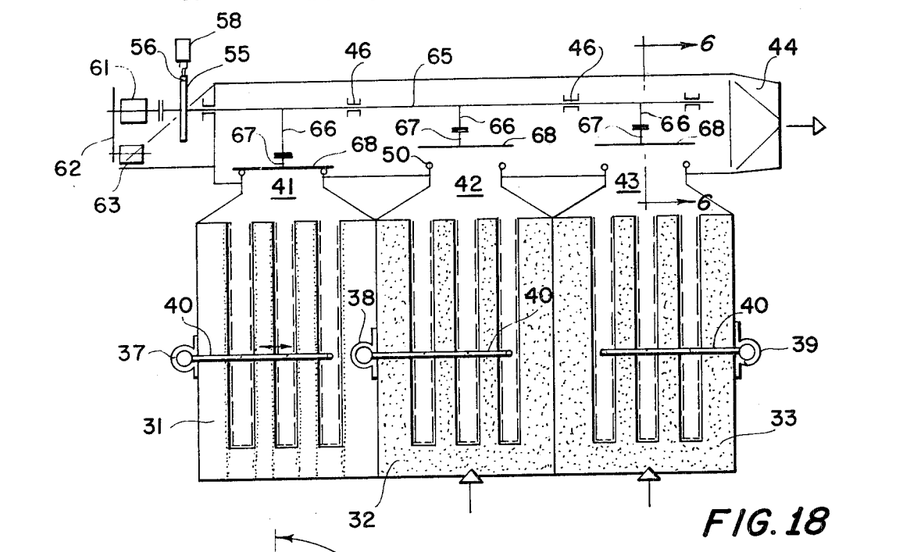
FIG. 18 shows schematically a cross section of a modified multichamber filtering apparatus.

A modified multichamber is shown in FIG. 18, this embodiment being identical to the embodiment of FIG. 16 except for the valve plates and the rotating shaft operating the valves plates. In this embodiment the main control shaft 45 is replaced by a straight main control shaft 65 which rotates in fixed bearing 46. In this embodiment the valve plates 68 open by rotating about an axis (which is located into the paper, only the outer edge of the valve plates being visible in FIG. 18). The shaft has fixed thereon to rotate therewith a number of cams 66, one cam being provided for each valve plate 68. Each valve plate includes a suitable follower member 67 rigidly attached to the respective valve plate 68. In operation, resilient means urge the valve plates 68 upwardly to their open positions and closing is effected by the downward force of the cam 66 acting on the followers 67. This valve structure is explained in greater detail with respect to FIGS. 19 through 22.

Figure 19:
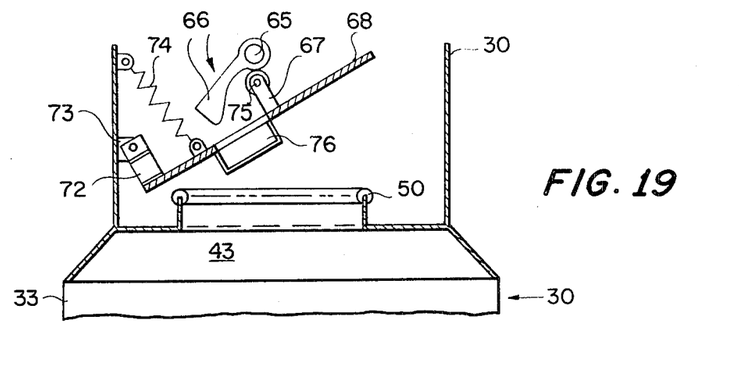
FIG. 19 shows the cross section of a valve plate according to the present invention and showing the valve in the open position.
Figure 20:
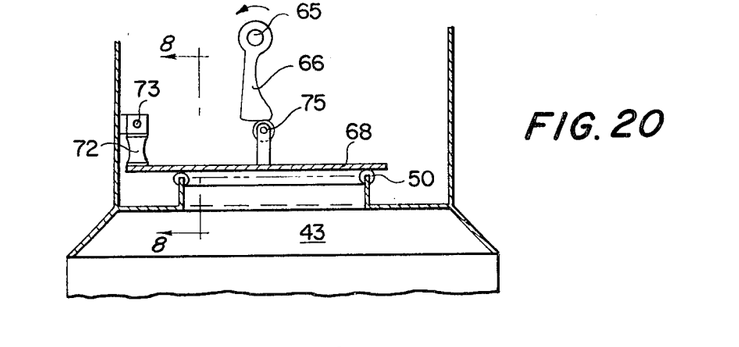
FIG. 20 shows the valve of FIG. 19 in the closed position.
Figure 21:
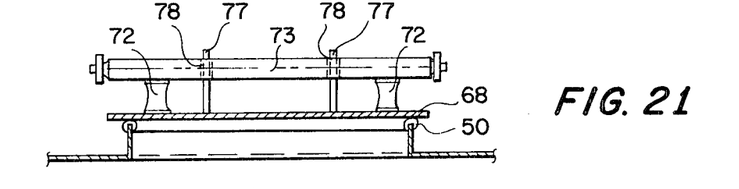
FIG. 21 is a longitudinal view of the valve structure taken along line 8—8 of FIG. 20.

The valve construction of FIG. 18 is shown in greater detail in FIGS. 19 through 22. In FIG. 19 the valve plate 68 is shown in its opened condition, the valve plate being urged upwardly by means of a spring 74. This spring also urges a roller or ball bearing 75 at the upper end of cam follower member 67 into engagement with the cam 66 which is fixed on and rotatable with the main control shaft 65. FIG. 20 shows the same elements upon further rotation of the shaft 65 whereat the cam 66 closes the valve plate 68. At a portion of the travel of cam 66 between the position of FIG. 19 and the position of FIG. 20, the outer end of cam 66 crosses the plane of valve plate 68. For this purpose, the valve plate 68 is provided with a recess 76 for receiving the outer end of cam 66.

In a filtering apparatus it is necessary to obtain an extremely good hermetic seal between the valve plate and the valve seat in order to carry out the filter element cleaning procedure in a satisfactory manner. To assure this closing, the connection between valve plate 68 and the pivot rod 73 is constructed so as to permit downward movement of the valve plate 68 under the force of cam 66 in addition to the pivoting movement of the valve plate 68 about the axis of pivot rod 73. For this purpose, and referring in particular to FIG. 21, there is provided a number of guide rods 77 fixed to the valve plate 68 and slidable in guide slots 78 in the rod 73. The only other connection between rod 73 and valve plate 68 is the elastic intermediate elements 72.

Figure 22:
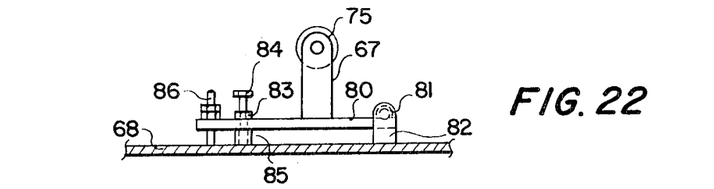
FIG. 22 shows on an enlarged scale the upper portion of the valve plate showing the adjusting means.

FIG. 22 shows an arrangement for adjusting the height of roller 75 relative to the surface of plate 68. For this purpose the element 67 is mounted on a lever 80. The lever 80 (FIG. 22) with the pivot point 81 and the joint bars 82 can be shifted in the direction of the contact pressure against the seal. This is managed by a screw 84, which fits into threads of the lever 80, and which only touches the valve plate and presses against it. The screw is locked by a locknut 83. The adjusted lever is fixed by nut and locknut on the threaded pin 86, which is welded on the valve plate. The lever is not connected with the pin 86 by threads.

Although preferred embodiments of the invention have been described in considerable detail, it should be apparent that the invention is capable of numerous modifications and variations apparent to those skilled in the art without departing from the spirit and scope of the invention.

I claim:

1. A filter apparatus comprising a housing forming a gas-flow path having a gas-flow inlet and a gas-flow outlet, a generally flat filter bag having a pair of relatively wide generally parallel sides, mounting means for mounting said filter bag generally upright in said housing, means dividing said gas-flow path into a dust side and a clean side, and providing flow communication therebetween one of said sides being on the outside of the filter bag and the other of said sides being on the inside of the filter bag, said filter bag including a bag frame, said mounting means including bearing means supporting the bag frame for pivotal movement about an axis, passing through the filter bag, a means for connecting the bag to the dividing means loosely and resiliently wherein substantially the entire bag oscillates with the bag frame, a vibrator frame connected to the outside of said filter bag and free from connection with said housing, an oscillating means including a balancing inertia mass mounted on the said vibrator frame, said oscillating means oscillating the filter bag and its bag frame about the said axis to shake the same and hence remove dust from the side of the filter bag facing the dust side of the gas-flow path, said oscillating means being free from any connection with the said housing, except through its said connection with the vibrator frame and the filter bag, whereby the oscillating movements of the oscillating means are transmitted directly through the vibrator frame to the filter bags and not through said housing.

2. A filter apparatus according to claim 1 wherein the oscillating means is enclosed in a dustproof hood in the housing.

3. A filter apparatus according to claim 2, wherein the housing has a bulge in which is located the oscillating means.

4. A filter apparatus according to claim 3, wherein the bulge is located in a door of the housing.

5. A filter apparatus according to claim 3, wherein said bulge surrounds a portion of the oscillating means and wherein a portion of the bulge is covered by an open dustproof member connected to the remainder of the bulge by a flexible collar.

6. An apparatus according to claim 1 including a plurality of said filter bags arranged side by side with the said relatively wide sides facing each other, said vibrator frame connected to all of said filter bags to oscillate all of them simultaneously.

7. A filter apparatus according to claim 6, wherein the side axis of the filter bags lies in a plane which plane extends transversely relative to the large generally wide sides of the filter bags, the center of gravity of the plurality of filter bags lying in this plane.

8. A filter apparatus according to claim 7 wherein the said axis of each bag extends in a plane generally parallel to the said wide sides of the filter bags and extends at an angle to the vertical, and wherein the said vibrator frame is attached to those vertical sides of the filter bags which are closest to the lower end of said axis.

9. A filter apparatus according to claim 6, wherein the said axis of the filter bags are generally horizontal and lie in a plane generally parallel to the said wide sides.

10. A filter apparatus according to claim 9, wherein the vibrator frame and the oscillating means are located at the bottom of the filter bags.

11. A filter apparatus according to claim 10 wherein the said dividing means includes a fixed opening at the said gas-flow outlet for each filter bag, said mounting means including a means for connecting the top of each filter bag to one of said fixed openings, the last said means including a flange surrounding and attached to the upper opening of the bag, and a claw element extending upward from said flange, said claw arranged to engage a fixed opening and hence guide the filter bag into place when the filter bag is introduced into the housing.

12. A filter apparatus according to claim 11, wherein the end of the claw which extends upwardly from the flange into said fixed opening is wedge shaped.

13. An apparatus according to claim 11, wherein the flange is bent convexly in the direction away from the bag.

14. A filter apparatus according to claim 6, wherein the said axis of the filter bags are located on one of the vertical narrow sides of the filter bags.

15. A filter apparatus according to claim 14, wherein the vibrator frame and the oscillating means are located at the vertical narrow sides of the filter frames opposite from the said narrow sides which contain the swivel axis.

16. A filter apparatus according to claim 6, wherein the said dividing means includes a fixed opening at said gas-flow outlet for each filter bag, and said mounting means including a means for connecting the top of that filter bag to one of the said fixed openings, the last said means including a flange surrounding and attached to the upper opening of each bag, the said connecting means including a flexible collar connecting the main part of each filter bag to this flange.

17. A filter apparatus according to claim 16, wherein the said axis extends horizontally along the top of the filter bag parallel to the said wide sides.

18. A filter apparatus according to claim 16, wherein portions of each filter bag extend upwardly above the flexible collar on each side of the swivel axis, said portions being positioned to abruptly engage a part of said fixed opening during each oscillation to further assist in shaking dust from the surface of each filter bag.

19. A filter apparatus according to claim 16, wherein the vibrator frame includes extensions extending to the sides beyond the filter bags, and including adjustable stops located on the housing in the path of the extensions, whereby during each oscillation, the extensions abruptly engage the stops to assist in shaking dust loose from the filter bags.

20. A filter apparatus comprising: a housing having means forming a plurality of gas-flow paths, each including a gas-flow inlet and a gas-flow outlet, a filter bag in each gas-flow path, means dividing each said gas-flow path into a dust side and a clean side and means supporting the filter bag wherein the gas flows through the inlet and through the filter bag from the dust side to clean side, and through the outlet, one of said sides being on the outside of the filter bag and the other of said sides being on the inside of the filter bag, a valve means closing each said outlet, a continuously cyclically operable control means including a continuously operating mechanical means operatively connected to said valve means to cyclically open and close said outlets in sequence, means for mounting the valve means in the housing for movement relative to the control means, said mounting means further including only resilient connections for connecting the valve means to the housing, the entire valve means thus being movable linearly relative to the housing, against the outlet under the force of the control means to close the outlet tightly, and separate means including a vibrator for vibrating the filter bag in each flow path, each vibrating means being operable to vibrate its respective filter bag to clean the same in response to the said cyclically operable control means when the outlet of its respective gas-flow path is closed by the said valve means.

21. A filter apparatus according to claim 20, said control means including a rotatable control shaft operatively connected to said valve means for operating the same, cam means operatively connected to said shaft for rotation therewith, said vibrating means being electrically operated, and including a switch means for controlling the timing of the operation of each vibrating means, said switch means being selectively operated by said cam means upon rotation of said shaft, the operation of the vibrating means thus being synchronized relative to the operation of the valve means.

22. The invention of claim 21 including a disc attached to the shaft to rotate therewith, said cam means comprising a raised cam surface fixed onto the disc.

23. The invention of claim 21, including a rod mounted in said apparatus to reciprocate back and forth, said valve means including a valve member mounted on the rod to reciprocate therewith, to open and close the paths and a lever connecting the rod with the rotatable shaft such that rotation of the shaft causes reciprocation of the rod.

24. The invention of claim 23 including a disc attached to the shaft to rotate therewith, said cam means comprising a raised cam surface on the outer circumferential periphery of the cam disc, and said lever pivotally connected to a lateral surface of the disc.

25. The invention of claim 23 wherein said valve member on the rod is operatively associated with two of said paths, said valve member closing one of the paths at one end of its reciprocating movement with the rod and closing the other path at the other end of its reciprocating movement with the rod and said resilient connection is included in the connection between the rod and the valve member.

26. The invention according to claim 21 each path including a valve seat and a separate valve member, and each said valve member being mounted for oscillating movement on and off of its respective seat.

27. The invention according to claim 26 wherein said valve means are mounted to be reciprocated towards and away from their respective valve seats, and including a main shaft rotatably with the control shaft, a connecting rod connecting each valve member with the main shaft, said connecting rod being connected to the main shaft by offset crank means, such that rotation of the main shaft causes back and forth movement of the connecting rod, and hence reciprocating movement of each valve member.

28. The invention of claim 27 wherein said main shaft is coaxial with and is connected to the control shaft, and including a disc attached to the control shaft to rotate therewith, said cam means comprising a raised cam surface on the surface of the disc.

29. The invention of claim 21 wherein means resilient includes means for adjusting the tightness of the closing valve member.

30. The invention of claim 26, each said valve member associated with each path being mounted to be moved towards and away from its seat, a main shaft rotatable with the control shaft with the valve members, cams on the main shaft and corresponding cam followers on the valve member, said resilient connection including means acting on the valve members for causing contact between the cams and followers, whereby rotation of the main shaft causes relative movement between the cams and followers to open and close the valve members relative to their valve seats.

31. The invention of claim 30 wherein each of said valve members mounted for pivotal movement about an axis, and a spring urging the valve member away from the valve seat, and said cam including a raised area for overcoming the force of the spring and urging the valve member closed onto the valve seat.

32. The invention of claim 20, wherein said valve means includes a cam for each outlet mounted for rotation with the control means, a valve member for each outlet, said valve member being mounted for pivoting movement about a pivot axis to open and close its outlet, a cam follower attached to each valve member at the center of force of the valve member, and the follower being positioned to be acted on by its corresponding cam to close the valve member.

33. The invention of claim 32 including a pivot rod for each said valve member, said resilient connection connecting each valve member to the pivot rod to assure pivoting movement of the valve member with the rod and also permitting reciprocating movement between the valve member and the rod during the opening and closing, such that the valve member can move linearly toward the outlet in the direction of the force supplied to it by the cam.

34. The invention of claim 33 wherein said resilient connection comprises an elastic intermediate element connecting the valve member to the pivot rod and cooperating guide rods and slots on the valve member and the pivot rod, such that the valve member turns with the pivot rod and slides relative thereto.

35. The invention of claim 32 said resilient connection further including means for urging the cam and follower into engagement with each other, tending to open the valve member, so that opening and closing of the valve member is dependent upon the contour of the can, 36. The invention of claim 35 wherein the cam contour is shaped so that the portion of the rotating cam required for opening and closing movement of the valve member is minimized and the portion of the rotating cam required for period during which the valve remains open or closed is maximized.

37. The invention of claim 32 wherein the valve member is a generally flat plate, the follower is mounted above the plate, and the plate includes a recess positioned to receive the cam during a portion of the rotation of the latter.

38. The invention of claim 37 including means for varying the distance of the cam follower from the valve member.

39. The invention of claim 38, the last said means including a lever attached to the valve member, the follower being attached to the lever, and means for varying the distance between the valve member and the lever.

* * * * *